(12) United States Patent
Knigge et al.

(10) Patent No.: US 8,922,939 B1
(45) Date of Patent: Dec. 30, 2014

(54) DISK DRIVE GENERATING FEED-FORWARD FLY HEIGHT CONTROL BASED ON TEMPERATURE SENSITIVE FLY HEIGHT SENSOR

(71) Applicant: Western Digital Technologies, Inc., Irvine, CA (US)

(72) Inventors: Bernhard E. Knigge, San Jose, CA (US); Jian Xu, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/922,417

(22) Filed: Jun. 20, 2013

Related U.S. Application Data (60) Provisional application No. 61/807,603, filed on Apr. 2, 2013.

(51) Int. Cl.
G11B 21/02 (2006.01)
G11B 21/21 (2006.01)

(52) U.S. Cl.
CPC .................................... G11B 21/21 (2013.01)
USPC ......................................................... 360/75

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |

(Continued)

*Primary Examiner* — K. Wong (57) ABSTRACT

A disk drive is disclosed comprising a head actuated over a disk, wherein the head comprises a fly height actuator (FHA) operable to actuate the head vertically over the disk. The head further comprises a temperature sensitive fly height sensor (TSS) operable to generate a fly height signal (FHS) representing a fly height of the head over the disk. An FHA actuation curve is measured for the FHA, and a conversion function is configured based on the FHA actuation curve, wherein the conversion function is operable to convert the FHS in first units (e.g., volts) into a corresponding fly height (FH) of the head in second units (e.g., nm).

24 Claims, 7 Drawing Sheets

(56) References Cited

U.S. PATENT DOCUMENTS

| | | |
|---|---|---|
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,417,981 B1 | 7/2002 | Smith |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,700,724 B2 | 3/2004 | Riddering et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,801,376 B2 | 10/2004 | Smith |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,883,368 B2 | 4/2005 | Smith et al. |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,894,854 B1 | 5/2005 | Carlson et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |

(56) References Cited

U.S. PATENT DOCUMENTS

| | | |
|---|---|---|
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,068,449 B2 | 6/2006 | Riddering et al. |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,180,692 B1 | 2/2007 | Che et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,239,471 B2 * | 7/2007 | Tanabe .................... 360/75 |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,440,219 B2 | 10/2008 | Zhu et al. |
| 7,451,344 B1 | 11/2008 | Rothberg |
| 7,457,072 B2 * | 11/2008 | Dieron et al. ................... 360/75 |
| 7,471,483 B1 | 12/2008 | Ferris et al. |
| 7,471,486 B1 | 12/2008 | Coker et al. |
| 7,477,470 B2 * | 1/2009 | Leis et al. .................... 360/75 |
| 7,486,060 B1 | 2/2009 | Bennett |
| 7,489,466 B2 | 2/2009 | Knigge et al. |
| 7,496,493 B1 | 2/2009 | Stevens |
| 7,508,617 B1 | 3/2009 | Mak et al. |
| 7,511,914 B2 * | 3/2009 | Hiller et al. .................... 360/75 |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,675,707 B1 | 3/2010 | Liu et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,787,201 B2 * | 8/2010 | Alex ............................... 360/31 |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,839,595 B1 | 11/2010 | Chue et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,916,420 B1 * | 3/2011 | McFadyen et al. ............. 360/75 |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,059,357 B1 | 11/2011 | Knigge et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |

(56) References Cited

U.S. PATENT DOCUMENTS

| | | |
|---|---|---|
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,300,338 B1 | 10/2012 | McFadyen |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,320,069 B1 | 11/2012 | Knigge et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

\* cited by examiner

DISK DRIVE GENERATING FEED-FORWARD FLY HEIGHT CONTROL BASED ON TEMPERATURE SENSITIVE FLY HEIGHT SENSOR

CROSS-REFERENCE TO RELATED APPLICATIONS

This application claims priority to provisional U.S. Patent Application Ser. No. 61/807,603, filed on Apr. 2, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the actuator arm as it seeks from track to track.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height during write/read operations.

DETAILED DESCRIPTION

Figure 1A:
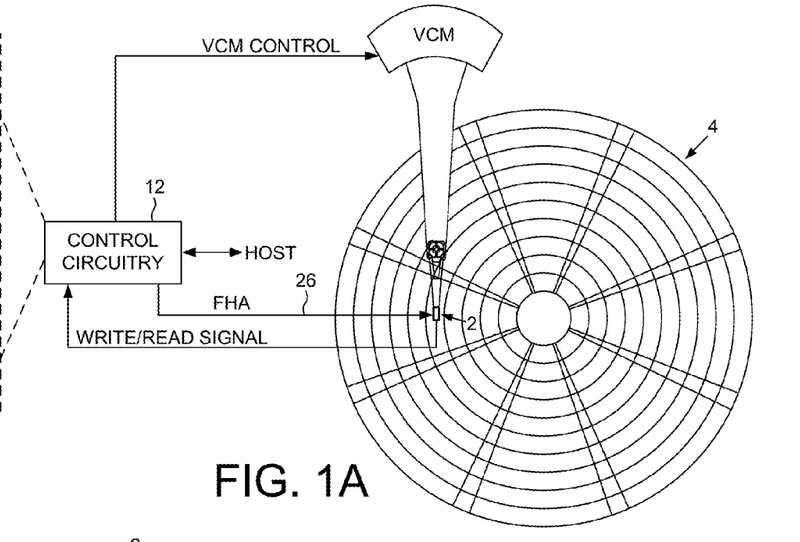
FIG. 1A shows a disk drive according to an embodiment comprising a head actuated over a disk.
Figure 1B:
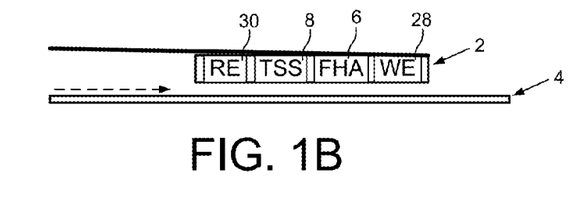
FIG. 1B shows a head according to an embodiment comprising a fly height actuator (FHA) and a temperature sensitive fly height sensor (TSS).

FIG. 1A shows a disk drive according to an embodiment comprising a head 2 actuated over a disk 4, wherein the head 2 comprises a fly height actuator (FHA) 6 shown in FIG. 1B operable to actuate the head 2 vertically over the disk 4. The head 2 further comprises a temperature sensitive fly height sensor (TSS) 8 operable to generate a fly height signal (FHS) 10 representing a fly height of the head 2 over the disk 4. The disk drive further comprises control circuitry 12 operable to execute the flow diagram of FIG. 1C, wherein a FHA actuation curve for the FHA 6 is measured (block 14). A conversion function 16 (FIG. 1D) is configured based on the FHA actuation curve (block 18), wherein the conversion function 16 is operable to convert the FHS 10 in first units (e.g., volts) into a corresponding fly height (FH) 11 of the head 2 in second units (e.g., nm).

Figure 1C:
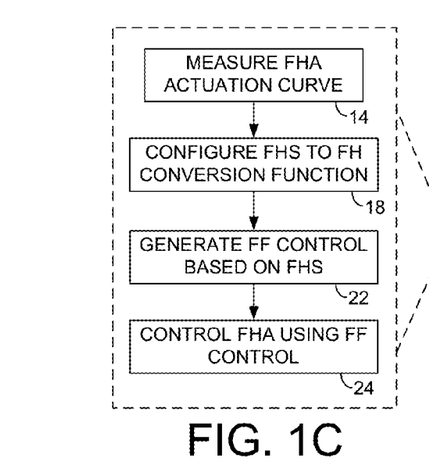
FIG. 1C is a flow diagram according to an embodiment wherein a conversion function is configured based on an FHA actuation curve, wherein the conversion function is operable to convert a TSS fly height signal (FHS) in first units (e.g., volts) into a corresponding fly height (FH) of the head in second units (e.g., nm).
Figure 1D:
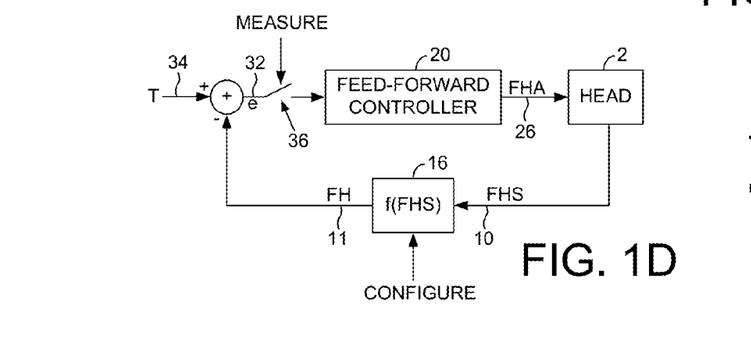
FIG. 1D shows a closed loop feedback system including a feed-forward controller for controlling the fly height of the head using the TSS according to an embodiment.

In the embodiment of FIGS. 1B and 1D, a feed-forward controller 20 generates feed-forward (FF) control based on the FHS 10 and the conversion function 16 (block 24), wherein the FF control is used to generate an FHA control signal 26 so that the head follows a topography variation of the disk 4. In other embodiments, the conversion function 16 of FIG. 1D may be used to convert the FHS 10 into a corresponding FH 11 for other reasons, such as to evaluate a waviness of the disk 4 as part of a manufacturing screening process.

In the embodiment of FIG. 1B, the FHA 6 may comprise any suitable actuator, such as a heater that actuates through thermal expansion, or a piezoelectric actuator that actuates through mechanical deflection. Also in the embodiment of FIG. 1B, the head 2 comprises a suitable write element 28, such as an inductive coil, and a suitable read element 30, such as a magnetoresistive element. In one embodiment, the control circuitry 12 calibrates a DC control signal applied to the FHA 6 in order to maintain the head 2 at an average fly height during write/read operations (where a different target fly height may be used for write and read operations). The topography of the disk 4 may vary for any number of reasons, including a warpage of the disk 4 caused by an uneven clamping force when clamping the disk 4 to a spindle motor that rotates the disk 4. In one embodiment, the DC control signal applied to the FHA 6 is modulated by an AC control signal so that the head follows the topography of the disk 4 during write/read operations.

In one embodiment, the AC control signal is generated as a feed-forward (FF) control signal used to generate the FHA control signal 26 (FIG. 1D). An error signal 32 is generated as a difference between a target fly height 34 and the measured FH 11 of the head 2. A switch 36 is closed in order to measure the FH variations due to the variation in the disk topography as reflected by the error signal 32. After measuring the FH variations, the feed-forward controller 20 generates FF control that will cause the head to follow the measured topography of the disk 4, thereby driving the error signal 32 toward zero. In one embodiment, the FF control is added to a DC control signal to generate the FHA control signal 26 applied to the FHA 6. During normal write/read operations, the switch 36 may be opened, or the switch 36 may remain closed in order to further adapt the FF control in response to the error signal 32.

The ability of the feed-forward controller 20 to cause the head 2 to follow the topography of the disk 4 depends, at least partly, on the accuracy of the FH 11 measurement. A known technique for measuring the FH 11 is a harmonic ratio technique (Wallace spacing equation) that measures an absolute head-media spacing (HMS) according to the ratio of the amplitude of the read signal at two different harmonics while reading a periodic pattern from the disk 4. This harmonic ratio can be generated by reading a periodic pattern at two different frequencies (e.g., a 2T and 6T pattern) and therefore may be referred to as an HMS 2T/6T technique. Another known technique for measuring the FH 11 is to evaluate the control signal applied to a variable gain amplifier (VGA) which attempts to maintain the amplitude of the read signal at a target amplitude when reading a periodic pattern from the disk, for example, a preamble in a servo sector. This technique may therefore be referred to as a servo VGA or SVGA technique. As describe below, these known techniques have drawbacks that may be overcome by using a temperature sensitive fly height sensor, such as a suitable magnetoresistive element having a thermal coefficient of resistance (TCR). In one embodiment, the temperature sensitive fly height sensor (TSS 8) may also be used as a touchdown sensor (TDS) for detecting when the head 2 contacts the disk 4 during a fly height calibration procedure.

Figure 2A:
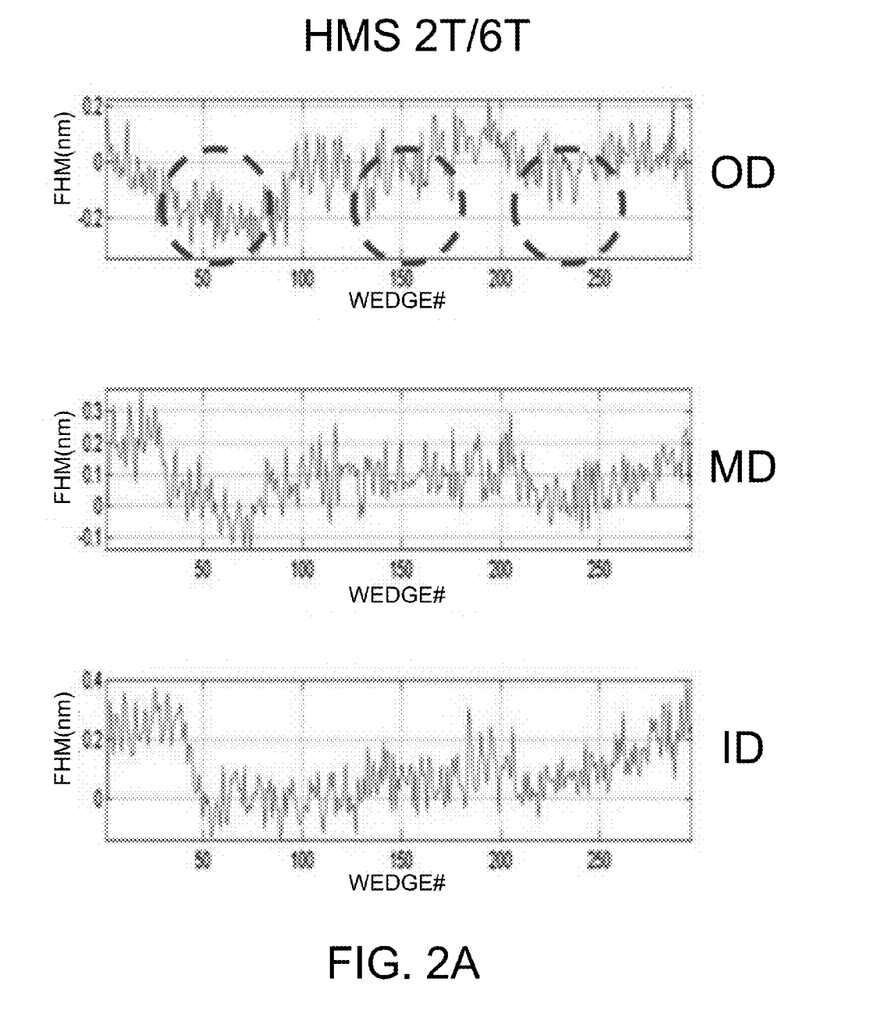
FIGS. 2A-2C show a comparison of the disk topography measurements between HMS 2T/6T, SVGA, and TSS fly height measurements at different radiuses (i.e., OD MD and ID).
Figure 2B:
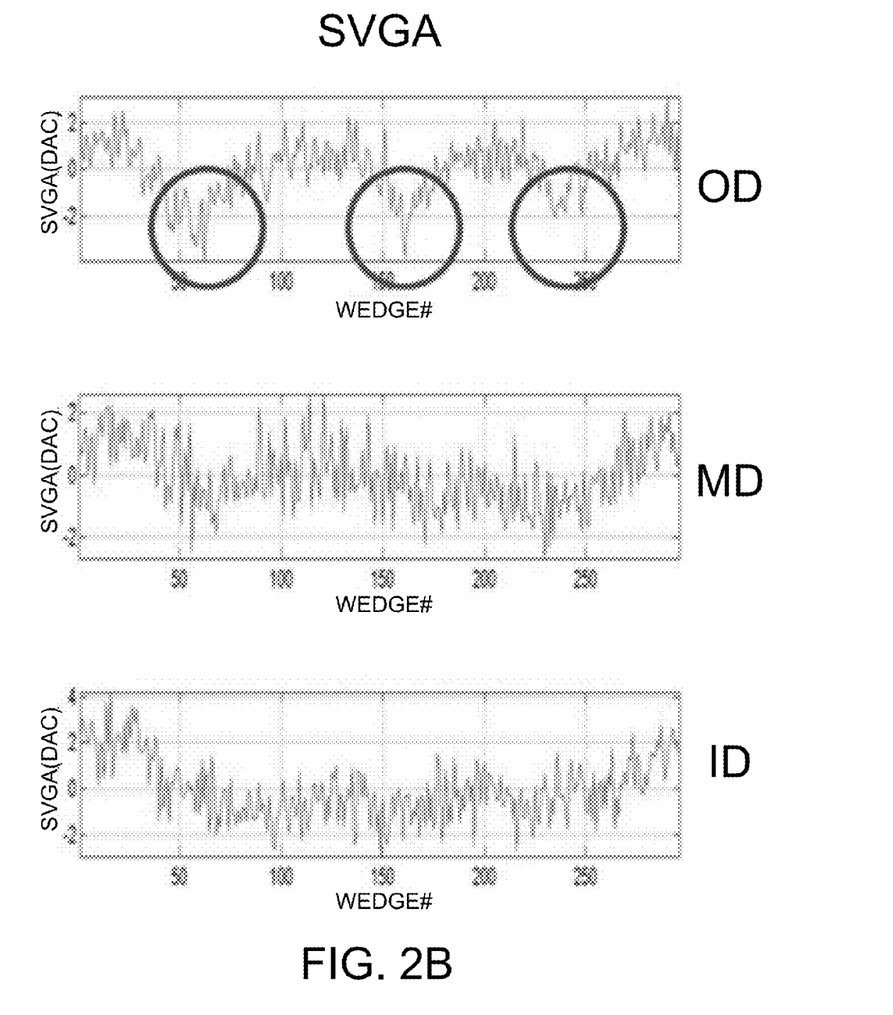
Figure 2C:
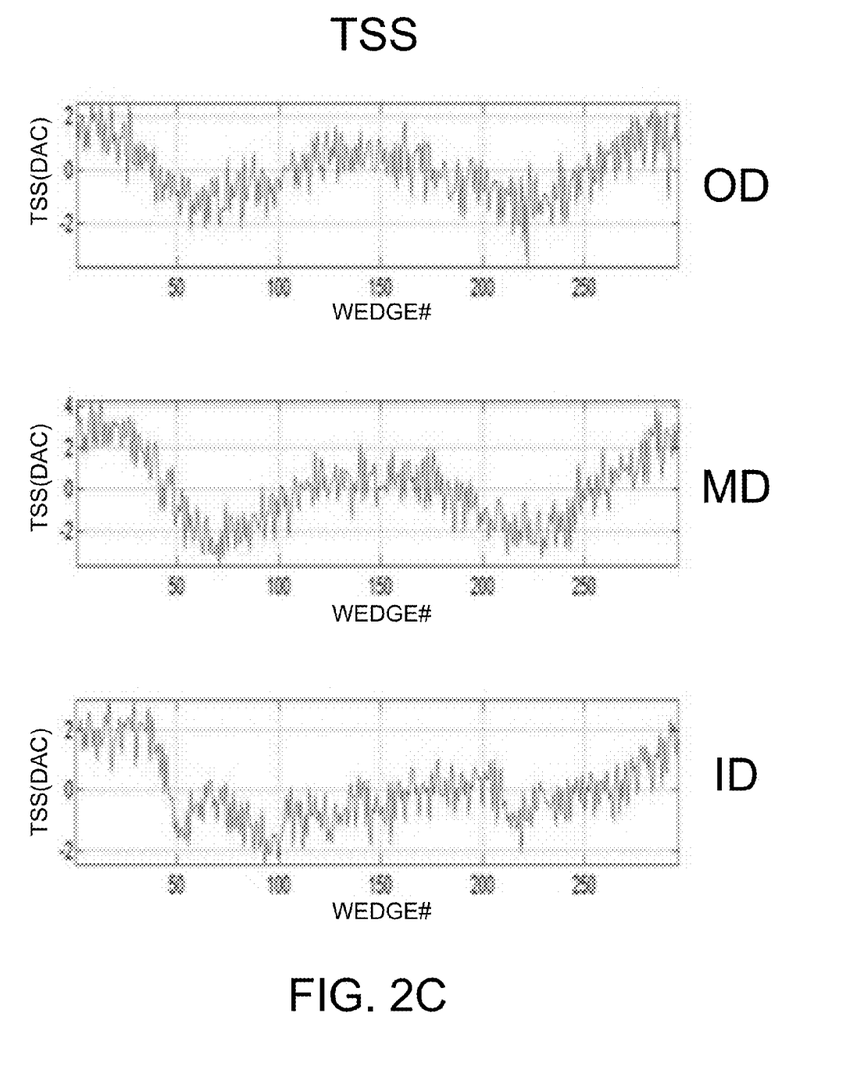

FIGS. 2A-2C show a comparison of the disk topography measurements between HMS 2T/6T, SVGA, and TSS at different radiuses (i.e., OD MD and ID). At the inner diameter (ID) of the disk 4, all the measured topographies using the three different methods are correlated. At the outer diameter (OD) of the disk 2, the topography from SVGA clearly show three low points, which is due to magnetic property variations causing read back signal amplitude variations (e.g., during the sputtering process disk clamp holders affect magnetic layers especially at OD). Topographies measured based on HMS 2T/6T at OD show clamp sputter shadow effect to some extent. TSS 8 is a thermal transducer so that it is not influenced by this effect; hence it may measure good topography at any radius. In addition, the TSS 8 may be significantly wider than the read element 30, thereby spanning multiple tracks of the disk 2 as compared to the single track of the read element 30. The wider coverage of the TSS 8 may improve the topography measurement, for example, by increasing the signal-to-noise ratio (SNR) as compared to the single track magnetic read back methods.

The TSS 8 may transduce the fly height of the head into an FHS 10 which may be, for example, a voltage or a current that varies due to a thermally induced change in resistance of the TSS 8. In one embodiment, the FHS 10 generated by the TSS 8 is converted into a corresponding FH 11 by configuring a conversion function 16. The conversion function 16 may, for example, convert the FHS 10 in the form of a voltage signal into an absolute fly height measurement (e.g., nm). In one embodiment, the conversion function 16 is configured based on a FHA actuation curve that may be generated, for example, when performing a touchdown calibration for the head 2 in order to determine the DC level for the FHA control signal 26.

Figure 3:
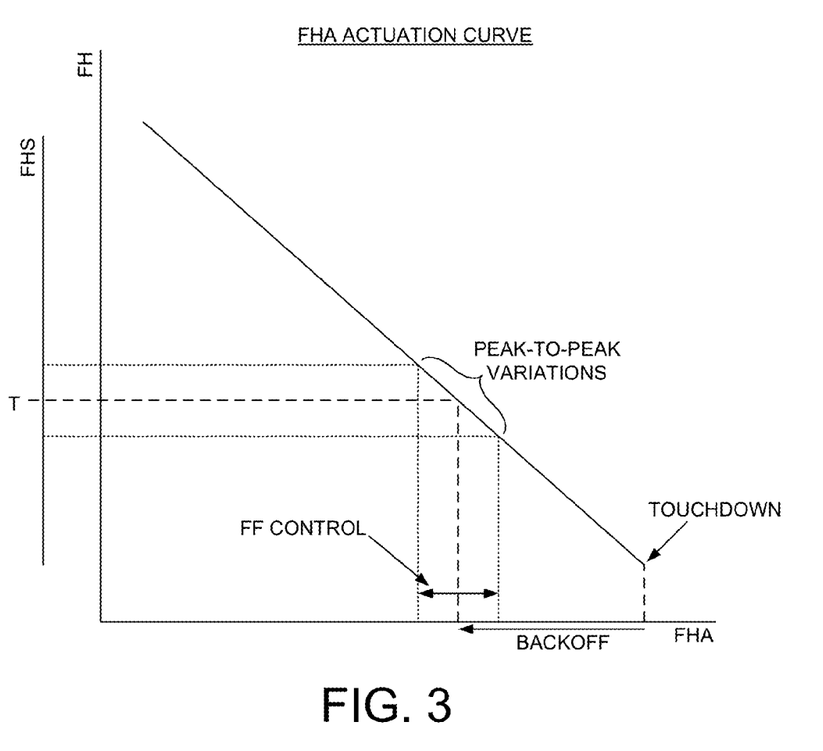
FIG. 3 shows an example FHA actuation curve generated during a touchdown calibration procedure according to an embodiment.

FIG. 3 illustrates an example FHA actuation curve generated during a touchdown calibration procedure by increasing the DC level of the FHA control signal 26, such as in step increments, and taking a corresponding FH measurement at each increment. In one embodiment, the FH measurement may be generated using the above described harmonic ratio technique which generates an absolute FH measurement representing the head-media spacing. The FH measurement may be generated while reading a periodic pattern in a servo sector, such as a preamble and/or burst pattern, wherein the measurement taken at each servo sector are averaged over a disk revolution to generate a DC FH measurement. The DC level of the FHA control signal 26 is increased and a new FH measurement taken until a touchdown is detected indicating the head 2 has contacted the disk 4. In one embodiment, the FHA actuation curve may be generated while servoing the head over an ID data track where the magnetic property variations for the read element 30 may be minimal, thereby increasing the accuracy of the FH measurements.

An operating DC level for the FHA control signal 26 may be generated by backing off from the touchdown level by an offset as illustrated in FIG. 3, wherein the backoff setting may correspond to a target (T) fly height. In one embodiment, during the touchdown calibration procedure the FHS 10 generated by the TSS 8 is saved for at least a subset of the DC level increments of the FHA control signal 26. For example, ten FHS 10 measurements may be taken proximate the target fly height, wherein the ten FHS 10 measurements and corresponding FH measurements may be fitted to a curve representing the conversion function 16. The resulting curve may be linear such that the conversion function 16 comprises a first order function, or the resulting curve may be more complex such that the conversion function 16 comprises a higher order function (e.g., quadratic). In addition, the FHA actuation curve shown in FIG. 3 is linear, whereas in other embodiments the FHA actuation curve may be more complex (e.g., quadratic).

After configuring the conversion function 16, the FHS 10 may be evaluated at each servo sector around a revolution of the disk. The FHS 10 is converted into a FH 11 by the conversion function 16 representing the topography of the disk. The FH 11 variation from the target (T) fly height represents the error signal 32 in terms of an absolute fly height measurement. This error signal 32 may be converted into units of the FHA control signal 26 using the FHA actuation curve such as shown in FIG. 3. The waveform of the error signal 32 representing the topography of the disk may be inverted in order to generate the FF control that causes the head 2 to follow the topography, thereby driving the error signal 32 toward zero.

Figure 4:
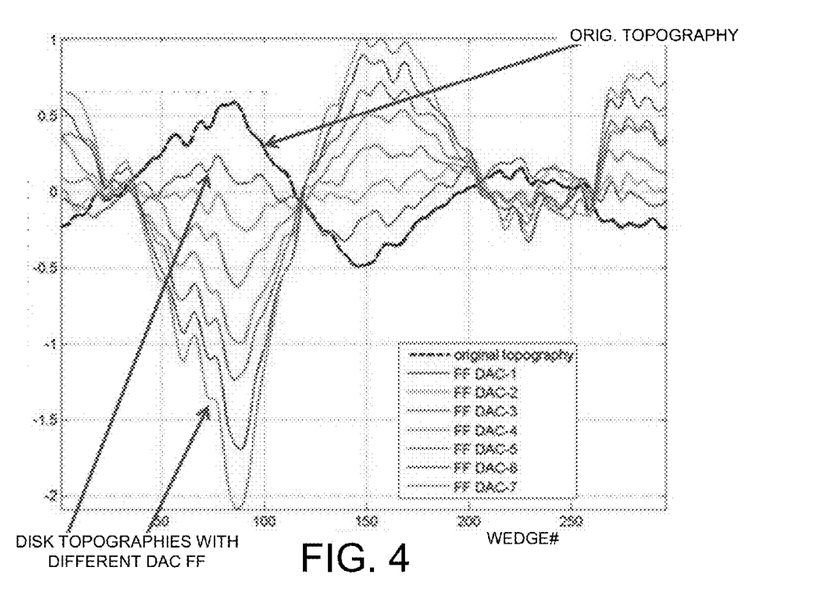
FIG. 4 illustrates an embodiment wherein a gain of the feed-forward controller may be varied so as to vary the amplitude of a feed-forward (FF) control.

In one embodiment, after generating the FF control by inverting the waveform of the measured error signal 32, there may be a residual amplitude in the error signal 32 due to an error in the FH 11 measurement. For example, there may be an error in the conversion function 16 causing an amplitude error in the FHS 10 to FH 11 conversion. FIG. 4 illustrates an embodiment wherein a gain of the feed-forward controller 20 may be varied so as to vary the amplitude of the FF control. That is, the waveform amplitude representing the inverted error signal 32 is varied and the resulting residual amplitude of the error signal 32 is measured. The gain of the feed-forward controller 20 that minimizes the amplitude of the residual error signal 32 is selected for normal operations.

In the example of FIG. 4, the feed-forward controller 20 generates the FF control in units of a digital-to-analog converter (DAC). The gain of the feed-forward controller 20 is varied by varying the peak-to-peak DAC setting representing the peak-to-peak amplitude of the inverted error signal 32 waveform. In the example of FIG. 4, the peak-to-peak DAC setting of plus/minus two values (FF DAC−2) minimizes the amplitude of the residual error signal 32 waveform. Referring again to FIG. 3, the DC level of the FHA control signal 26 corresponding to the target (T) fly height is modulated by plus/minus two DAC settings corresponding to the peak-to-peak amplitude of the inverted error signal 32 waveform of FIG. 4.

Figure 5:
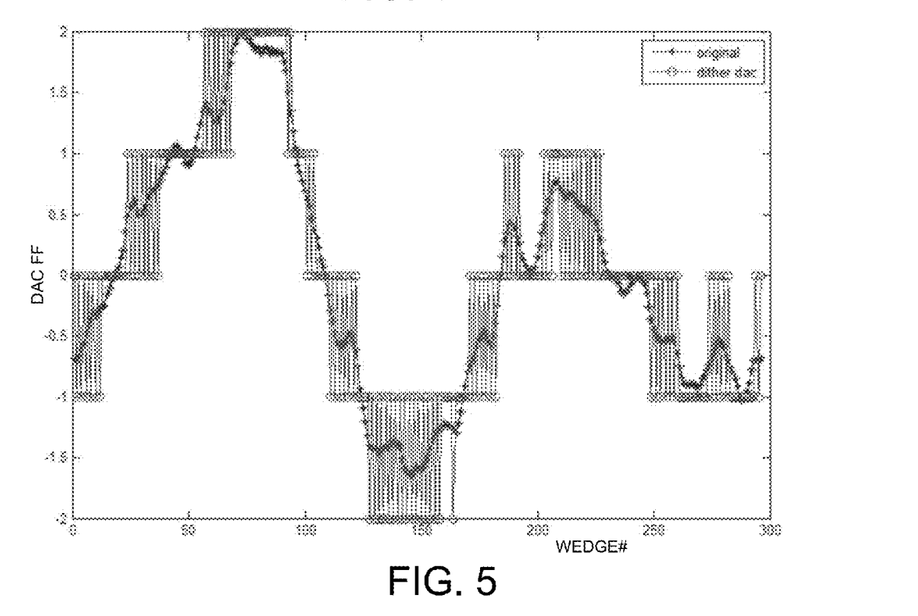
FIG. 5 illustrates an embodiment wherein the resolution of DAC settings representing the FF control may be increased by dithering between the settings.

In one embodiment, the resolution of the DAC settings representing the FF control may be increased by dithering between the settings. An example of this embodiment is shown in FIG. 5 which corresponds to the peak-to-peak DAC setting of plus/minus two values (FF DAC−2) that minimizes the amplitude of the residual error signal 32 waveform of FIG. 4. FIG. 5 shows the original FH measurements at each servo sector together with the dithered DAC values. When the FH measurement corresponds to an intermediate DAC setting (e.g., between 0 and 1), the DAC is dithered between the two settings in order to generate an averaged FHA control signal 26 that corresponds to the intermediate FH measurement. In other embodiments, a higher resolution DAC may be employed to increase the resolution of the FHA control signal 26 without needing to dither the DAC.

Figure 6:
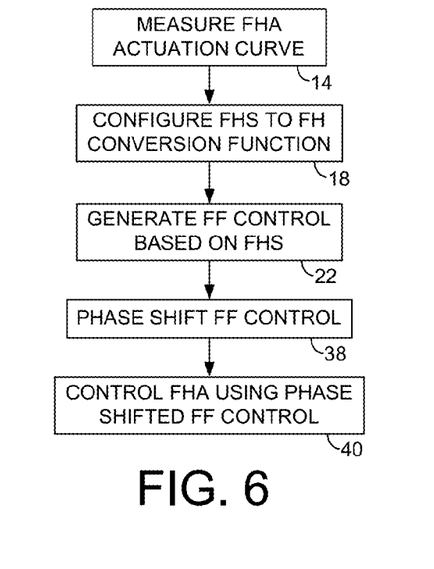
FIG. 6 is a flow diagram according to an embodiment wherein the FF control is phase shifted by one or more servo sectors, and the FHA control signal is generated from the phase shifted FF control in order to compensate for a transient response (time constant) of the FHA.

FIG. 6 is a flow diagram according to an embodiment which extends on the flow diagram of FIG. 1C, wherein the FF control is phase shifted by one or more servo sectors (block 38), and the FHA control signal 26 generated from the phase shifted FF control (block 40) in order to compensate for a transient response (time constant) of the FHA 6. In one embodiment, the gain of the FF control is adjusted until the error signal 32 is minimized as described above, and then the FF control is phase shifted by one or more servo sectors. In one embodiment, the FF control may be phase shifted incrementally (e.g., by one servo sector) until the error signal 32 reaches a minimum.

In one embodiment, the conversion function 16 of FIG. 1D is configured at block 18 of FIG. 1C based on the FHA actuation curve (e.g., FIG. 3) generated while servoing the head 2 over an ID data track. The conversion function 16 may then used to generate the FF control at different radial locations across the disk 4 to account for topography variations that may occur across the disk radius. The different FF control waveforms may be stored in memory, and during normal operation the FF control may be read from the memory based on the radial location of the head 2. In another embodiment, the saved FF control waveforms may be interpolated in order to generate a FF control waveform corresponding to an intermediate radial location between two of the measured radial locations. In yet another embodiment, the FF control waveforms measured at the different radial locations may be curve fitted to a function, and during normal operation the FF control may be generated based on the function with the radial location of the head as the input to the function.

Figure 7:
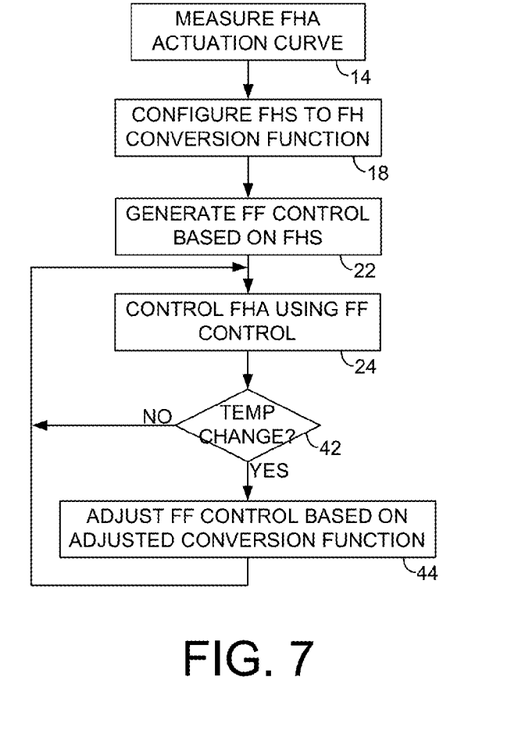
FIG. 7 is a flow diagram according to an embodiment wherein the FF control waveforms may be calibrated across the radius of the disk at specific environmental conditions (e.g., at a specific ambient temperature).

In one embodiment, the response of the TSS 8 may vary based on an environmental condition of the disk drive, such as the ambient temperature. Accordingly, in one embodiment the conversion function 16 of FIG. 1D may be calibrated over a range of different environmental conditions (e.g., different ambient temperatures) by at least partially regenerating the FHA actuation curve for a plurality of different environmental conditions. In another embodiment, the conversion function 16 may be recalibrated while the disk drive is deployed in the field when a change in an environmental condition is detected. In either embodiment, the FF control waveforms may be calibrated across the radius of the disk at specific environmental conditions (e.g., at a specific ambient temperature). This embodiment is illustrated in the flow diagram of FIG. 7, wherein when a change in an environmental condition is detected while the disk drive is deployed in the field (block 42), the FF control waveforms corresponding to the different radial locations may be adjusted based on the corresponding adjustment to the conversion function 16 (block 44). For example, if the adjustment to the conversion function 16 is a change in gain, there may be a corresponding change in the amplitude of the saved (or generated) FF control waveforms to compensate for the change in the environmental condition.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk;
   a head actuated over the disk, the head comprising a fly height actuator (FHA) and a temperature sensitive fly height sensor operable to generate a fly height signal (FHS) representing a fly height of the head over the disk; and control circuitry operable to:
measure a FHA actuation curve for the FHA; and
configure a conversion function based on the FHA actuation curve, wherein the conversion function is operable to convert the FHS in first units of measurement into a corresponding fly height (FH) of the head in second units of measurement.

2. The disk drive as recited in claim 1, wherein the control circuitry is further operable to:
generate feed-forward (FF) control based on the FHS and the conversion function; and
generate an FHA control signal based on the FF control so that the head follows a topography variation of the disk.

3. The disk drive as recited in claim 2, wherein the control circuitry is further operable to generate the FF control based on an error between the FH of the head generated by the conversion function and a target fly height.

4. The disk drive as recited in claim 1, wherein the control circuitry is further operable to generate the FHA actuation curve while servoing the head near an inner diameter of the disk.

5. The disk drive as recited in claim 2, wherein the control circuitry is further operable to generate the FF control as a waveform representing the topography variation of the disk.

6. The disk drive as recited in claim 5, wherein the control circuitry is further operable to generate the FF control by varying an amplitude of the waveform representing the topography variation of the disk until a difference between the FH of the head generated by the conversion function and a target fly height falls below a threshold.

7. The disk drive as recited in claim 5, wherein the control circuitry is further operable to generate the FF control by varying a phase of the waveform representing the topography variation of the disk until a difference between the FH of the head generated by the conversion function and a target fly height falls below a threshold.

8. The disk drive as recited in claim 5, wherein the control circuitry is further operable to dither the FF control representing the waveform to increase an effective resolution of the FF control.

9. The disk drive as recited in claim 5, wherein the control circuitry is further operable to generate the FF control representing the waveform at multiple radial locations across the disk.

10. The disk drive as recited in claim 1, wherein the control circuitry is further operable to calibrate the conversion function over a plurality of different environmental conditions.

11. The disk drive as recited in claim 10, wherein the environmental conditions comprise a plurality of different ambient temperatures of the disk drive.

12. The disk drive as recited in claim 1, wherein the control circuitry is further operable to evaluate a waviness of the disk based on the FH of the head in the second units.

13. A method of operating a disk drive comprising a disk, a head actuated over the disk, the head comprising a fly height actuator (FHA) and a temperature sensitive fly height sensor operable to generate a fly height signal (FHS) representing a fly height of the head over the disk, the method comprising:
measuring a FHA actuation curve for the FHA; and
configuring a conversion function based on the FHA actuation curve, wherein the conversion function is operable to convert the FHS in first units of measurement into a corresponding fly height (FH) of the head in second units of measurement.

14. The method as recited in claim 13, further comprising:
generating feed-forward (FF) control based on the FHS and the conversion function; and
generating an FHA control signal based on the FF control so that the head follows a topography variation of the disk.

15. The method as recited in claim 14, further comprising generating the FF control based on an error between the FH of the head generated by the conversion function and a target fly height.

16. The method as recited in claim 13, further comprising generating the FHA actuation curve while servoing the head near an inner diameter of the disk.

17. The method as recited in claim 14, further comprising generating the FF control as a waveform representing the topography variation of the disk.

18. The method as recited in claim 17, further comprising generating the FF control by varying an amplitude of the waveform representing the topography variation of the disk until a difference between the FH of the head generated by the conversion function and a target fly height falls below a threshold.

19. The method as recited in claim 17, further comprising generating the FF control by varying a phase of the waveform representing the topography variation of the disk until a difference between the FH of the head generated by the conversion function and a target fly height falls below a threshold.

20. The method as recited in claim 17, further comprising dithering the FF control representing the waveform to increase an effective resolution of the FF control.

21. The method as recited in claim 17, further comprising generating the FF control representing the waveform at multiple radial locations across the disk.

22. The method as recited in claim 13, further comprising calibrating the conversion function over a plurality of different environmental conditions.

23. The method as recited in claim 22, wherein the environmental conditions comprise a plurality of different ambient temperatures of the disk drive.

24. The method as recited in claim 13, further comprising evaluating a waviness of the disk based on the FH of the head in the second units.

* * * * *